United States Patent [19]

Smith

[11] 4,453,335

[45] Jun. 12, 1984

[54] AUDIBLE FISH LURE

[76] Inventor: Joseph M. Smith, 15303 70th Ave., East, Puyallup, Wash. 98373

[21] Appl. No.: 366,377

[22] Filed: Apr. 7, 1982

[51] Int. Cl.³ .............................................. A01K 85/00
[52] U.S. Cl. .................... 43/42.31; 43/42.06
[58] Field of Search ............................. 43/42.31, 42.06

[56] References Cited

U.S. PATENT DOCUMENTS

| 2,488,678 | 11/1949 | Nardi | 43/42.06 |
| 2,853,826 | 9/1958 | Romeo | 43/42.31 |
| 2,881,548 | 4/1959 | Backe | 43/42.31 |
| 2,909,863 | 10/1959 | Rector | 43/42.31 |
| 3,071,884 | 1/1963 | Peltz | 43/17.1 |
| 3,449,852 | 6/1969 | Mitchell | 43/42.31 |
| 3,705,465 | 12/1972 | Charney | 43/42.31 |
| 3,905,147 | 9/1975 | Snipes | 43/42.31 |
| 4,008,539 | 2/1977 | Gardner | 43/42.31 |
| 4,102,075 | 7/1978 | Wagner | 43/42.06 |

Primary Examiner—Gene P. Crosby
Attorney, Agent, or Firm—Brian J. Coyne

[57] ABSTRACT

A fishing lure is disclosed that emanates an audible sound as the lure is drawn through water. Sound is generated by the oscillatory movement of a ball in a bore within the lure, in response to movement of water through the bore. The rate of oscillation, and thus the pitch of the sound, can be adjusted by the user.

7 Claims, 8 Drawing Figures

AUDIBLE FISH LURE

BACKGROUND OF THE INVENTION

This invention is for a fishing lure wherein sounds are generated by the fishing lure as the lure is drawn through the water. In particular, the present invention produces a sound by oscillatory movement of a ball in a bore within the lure, in response to flow of water through the bore.

BRIEF DESCRIPTION OF THE PRIOR ART

A variety of different fishing lures have been described that are capable of generating sounds as the lure is drawn through the water. One type of audible lure, described by A. S. Wagner, et al., generates aquatic sounds by flow of water through a fluidic self resonating chamber. U.S. Pat. No. 4,102,075 (July 25, 1978; Class 43/42.06, 17.1, 42.31). A second type of audible lure produces sounds by utilizing the vibratory or swimming motion of the fish lure itself. F. D. Rector, et al., have described a lure wherein a spring-mounted weight inside an internal recess in the body of the lure creates a rapid tapping noise as the lure itself moves under a vibratory swimming motion. U.S. Pat. No. 2,909,863 (Oct. 29, 1959; Class 43/42.31). The sonic action fish lure described by J. C. Backe has a head, and a tail portion pivotally attached thereto. To the head and tail portions, and at their junction, are mounted in close engagement a leaf spring and a circular enlargement with teeth, respectively, such that the relative motions of the head and tail create sounds in synchrony therewith. U.S. Pat. No. 2,881,548 (Apr. 14, 1959; Class 43/42.31). A third type of audible fish lure utilizes the relative movement of water flowing through an internal cavity to create an oscillatory motion of sound-producing elements. In the vibrasonic fishing lure described by K. J. Peltz, for example, the relative linear motion of water through the lure causes rapid rotation of a helically curved vane, which vane has an eccentrically located center of gravity, and thus induces an oscillation in the vane's support post. The oscillation of the support post against the body produces sonic vibrations that are perceptible to fish. U.S. Pat. No. 3,071,884 (Jan. 8, 1963; Class 43/17.1). The audible fishing lure disclosed by J. Romeo is somewhat similar, except that the tail portion is designed to rotate freely with a rotatable shaft, in response to water movement. A ratchet wheel is circumposed about the shaft and rotates with it, thus producing a buzz by alternately engaging and disengaging a metal plate attached to the lure body. U.S. Pat. No. 2,853,826 (Sept. 9, 1975; Class 43/42.31).

The present invention is for a lure of this third type, as this device generates sound by converting the linear movement of water directly to mechanical oscillations, rather than by fluid self resonance or by vibratory motions of the lure itself. None of the prior disclosures of lures of the third type, however, include sound generation by oscillation of a ball within a bore in response to movement of fluid through the bore.

SUMMARY OF THE INVENTION

It is an object of my invention to provide a fishing lure having a fluid flow channel therethrough, and a ball that oscillates in response to the fluid flow, to produce an audible sound.

It is yet another object of my invention to provide a fishing lure having hooks attached thereto with a fluid flow channel therethrough, and a ball that oscillates in response to the fluid flow as the lure is pulled through the water, wherein the frequency of the sound thus produced can be conveniently adjusted by the fisherman.

A still further object of my invention is to provide a fish lure of this kind, which is of simple construction, has a minimum number of parts, is inexpensive to manufacture and effective in use.

BRIEF DESCRIPTION OF THE DRAWINGS

Similar numerals refer to similar parts throughout the several views.

BRIEF DESCRIPTION OF THE PREFERRED EMBODIMENT

Figure 1:
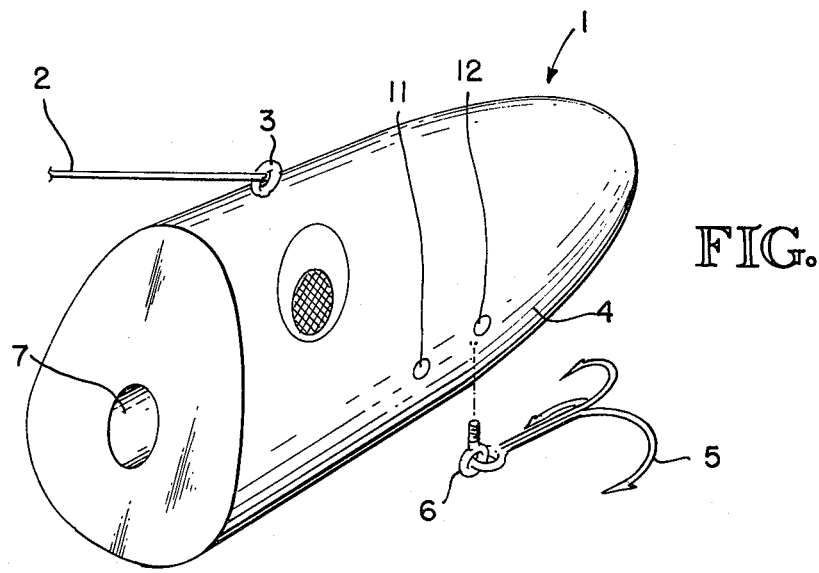
FIG. 1 is a perspective view of my audible fish lure in actual use.

Referring now to FIG. 1, my fishing lure, represented generally by reference numeral 1, is shown in actual use. A fishing line 2 is attached to an eyelet 3 that is embedded in the fish lure body 4. A hook 5 is attached to the underside of the lure body 4 via a second eyelet 6. As the fishing lure is pulled through the water by fishing line 2, water will flow through bore 7, producing an audible hum in the manner that will now be described.

Figure 2:
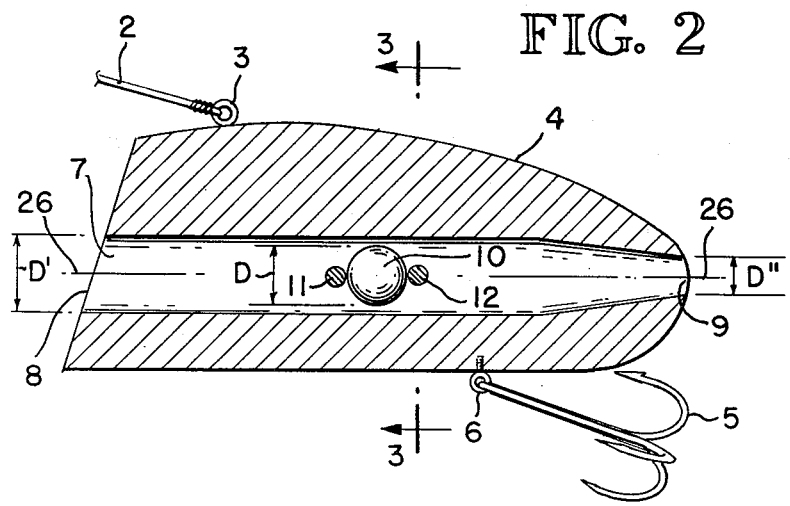
FIG. 2 is a longitudinal, sectional view thereof.

Referring now to FIG. 2 of the drawings there is shown the lure body 4 in longitudinal section. The bore 7 has an inlet end 8 and an outlet end 9, is substantially cylindrical and disposed along the longitudinal axis 26 of the lure body 4. Within the bore 7, and approximately midway its length, is a ball 10 with diameter D slightly less than the inlet end diameter D'. The outlet end diameter D" can be equal to, or less than, the inlet end diameter D', but, in general, improved performance can be obtained by reducing the outlet end diameter D" below that of the diameter of the ball D. Pins 11 and 12 are inserted in parallel through the body 4 and on opposites sides of the ball 10, transverse the longitudinal axis 26 of the body 4, and in a plane through the axis 26 of the bore 7.

Figure 3:
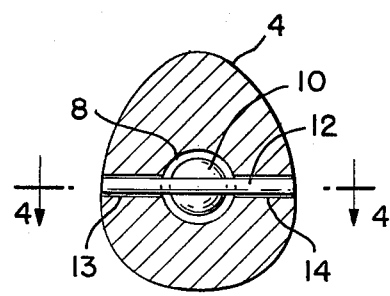
FIG. 3 is a transverse, sectional view on the line 3—3 of FIG. 2.

Referring now to FIG. 3, pin 12 may be secured to the body 4 by a force fit through apertures 13, 14 on opposites sides of the body 4, or by cement, and pin 11 (not shown) may be attached to the body 4 in a similar manner. I believe that the manner of operation of my invention is as follows. As the lure 1 is drawn through the water, water enters the bore 7 at the inlet end 8, and proceeds through the bore 7 in substantially linear flow until it strikes the ball 10. Since the ball 10 is restrained by pin 12 from moving with the water flow, the water is diverted around the ball 10 through the relatively narrow space defined by the surface of the ball 10 and the surface of the bore 7. According to Bernoulli's Principle, the flow velocity must increase as the water rushes around the ball 10, with an accompanying decrease in pressure. Unless the ball 10 is precisely on the bore axis 26, therefore, the ball will experience unequal pressure on its opposite sides, and tend to move transversely across the bore 7.

Figure 4A:
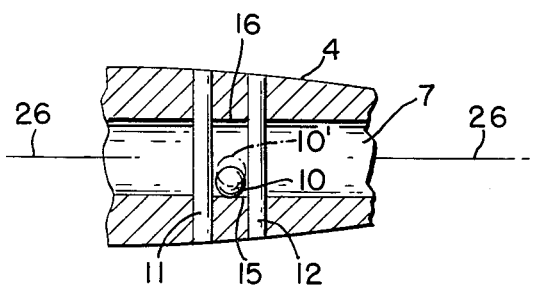
FIG. 4(A) and (B), are each the same enlarged fragment of the lure body showing a longitudinal section on the line 4—4 of FIG. 3, and illustrating the different actions of a small ball, FIG. 4(A), and a large ball, FIG. 4(B).

Referring now to FIG. 4(A), it has been observed that if the diameter D of the ball 10 is sufficiently small compared to the diameter D' of the bore 7, the ball 10 will tend to remain on one side of the bore 7 and produce no sound. In this condition the flow pressure on the surface of the ball 10 at the point 15 where it contacts the surface of the bore 7 is less than the pressure on the opposite side of the ball 10. Furthermore, even if such a ball 10 strikes the surface of the bore at point 15 and bounces back toward the bore axis 26, unless the center of the ball 10 crosses the axis 26 of the bore, the ball 10 will be pushed back by the water flow to the same point 15.

Figure 4B:
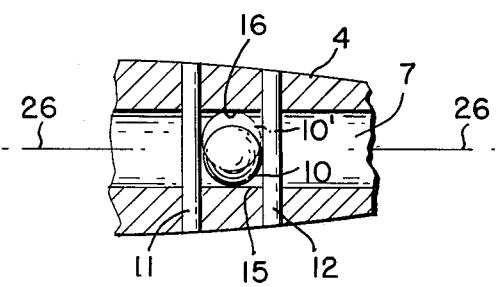

Referring now to FIG. 4(B), if the ball 10 is sufficiently large relative to the diameter D' of the bore 7, and if the ball 10 bounces from a point of contact with the bore surface 15, the distance from the center of the ball 10 to the axis 26 of the bore 7 being relatively short, the ball 10 can travel to an opposite point 16 of the surface of the bore 7, again bounce, and so on, thus oscillating within the bore 7. These mechanical oscillations are perceived as a hum by fish, and can be felt as a vibration on the fish line 2 by the fisherman.

As might be expected, the closer the diameter D of the ball 10 is to the inlet diameter D' of the bore 7, the faster the ball 10 will oscillate and the higher the pitch of the sound that will emanate from the lure. The pitch of my lure can, therefore, be made adjustable by certain modifications to its design, as may be seen by referring to FIG. 5. The elements of my modified lure are the same as those heretofore described, except that the ball 10 is restrained by a rod 18, rather than by pins 11 and 12, and certain modifications are introduced to the bore 7 and the lure body 4, as will be hereafter described.

Figure 5:
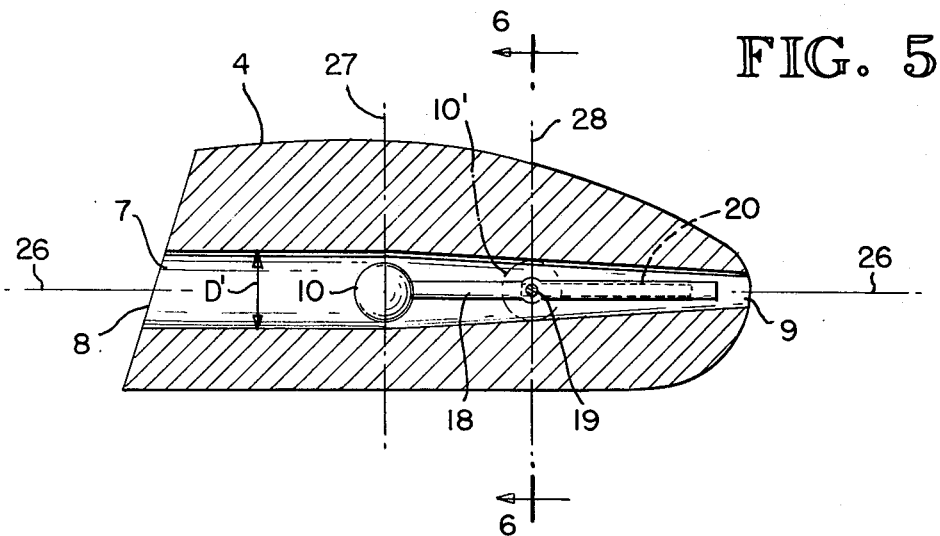
FIG. 5 is a longitudinal, sectional view of a modified lure of my invention.
Figure 6:
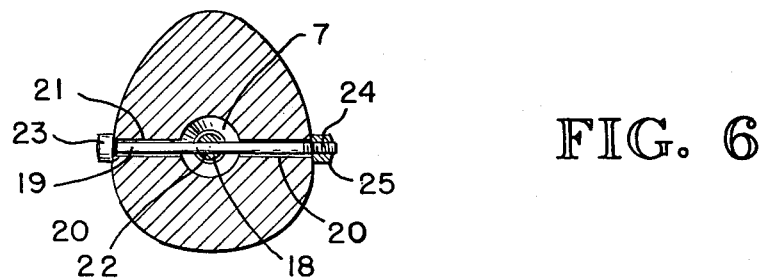
FIG. 6 is a transverse, sectional view thereof taken on line 6—6 of FIG. 5.

Referring now to FIG. 5 and FIG. 6, the ball 10 is again mounted about midway the length of the bore 7 by attaching to one end of rod 18 the surface of the ball nearest to the outlet end 9. The said rod 18 extends along the axis 26 of the bore 7 to approximately the outlet end 9. Approximately midway its length, the rod 18 is pivotally attached to pivot pin 19, wherein the said pin 19 is inserted transversely through narrow slots 20 and 21 on opposite sides of the body 4, and through an aperture 22 in the rod 18, which apertures are shown in FIG. 6. Thus, the rod 18 with ball 10 attached is free to oscillate about the pivot pin 19, in the manner of a pendulum. Some means for securing pivot pin 19 to the lure body 4 is necessary. One such suitable means is illustrated in FIG. 6. One end of the pivot pin 19 extends out from the body 4 and is formed into a knob 23. The opposite end of the pivot pin 19 extends beyond the opposite side of the body 4 and has threads 24. A second knob 25 with internal threads is threaded onto threads 24. As should be obvious, therefore, after loosening knob 25 by unsecuring it from threads 24, the ball 10 may be moved by the fisherman within the bore 7 from an extreme upstream point 27 nearest to the inlet end (shown in FIG. 5 by by solid outline of ball, 10) to an extreme downstream position 28 nearest to the outlet end (shown by broken outline of ball, 10'), corresponding to the lengthwise extent of the slots 20, 21. Re-tightening knob 25 will resecure the ball 10 and pivot pin 19 to the lure body 4.

Again referring to FIG. 5, along the allowed length of travel of the ball 10, the diameter of the bore 7 is gradually decreased from a maximum diameter D' at the upstream limit 27 of travel of the ball 10 down to the diameter D of the ball 10 itself, at the downstream limit 28. As the position of the ball 10 is adjusted by the fisherman from point 27 downstream towards point 28, the sound pitch will increase, thus enabling the fisherman to optimize the attractiveness of the lure for various fishing conditions.

Figure 7:
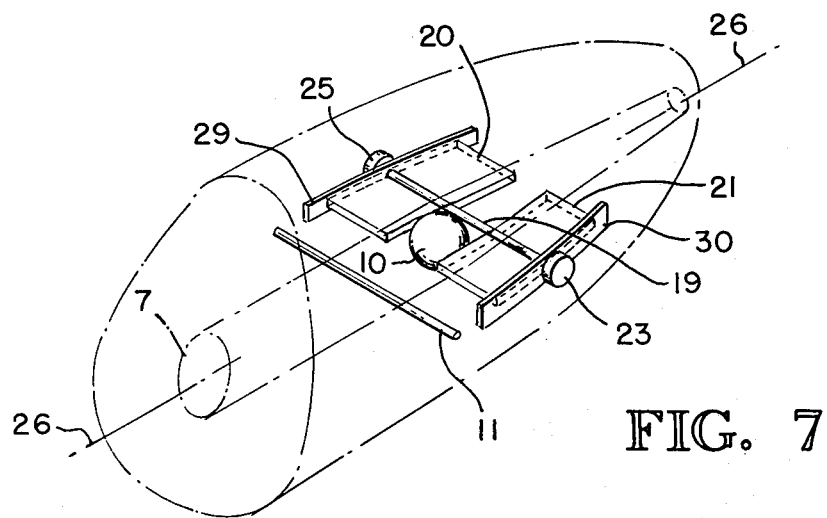
FIG. 7 is a perspective view of the oscillatory mechanism of a modified lure of my invention, depicting particularly slot covers for the prevention of the movement of water through the slots in the lure body.

As water may move through the slots 20, and 21, which could prevent oscillation of the ball 10, it may be necessary to provide means for eliminating movement of water through the slots. A flexible sleeve tailored to fit closely around the lure body is one possibility. Alternatively, as shown in FIG. 7, slot covers 29, and 30, can be attached to each end of the pivot pin 19 and positioned parallel to, and in contact with, slots 20 and 21, such that the slots would be covered at all times. Again referring to FIG. 7, in an alternative embodiment of my invention, the length of the rod 18 can be reduced to zero, and the ball 10 can be left completely disattached from pivot pin 19. The ball can then oscillate more rapidly as the damping effect of the rod is eliminated. Some means to prevent the ball 10 from rolling out the inlet end of the bore is then necessary. To this end, the fixed pin 11 is inserted through the lure body 4, through the axis of the bore 26 and on the inlet end side of the ball 10, sufficiently far upstream along the bore 7 as to not interfere with adjustment of the position of the ball 10.

Obvious changes may be made within the scope of the following claims without departing from the spirit of my invention. For instance, a variety of mechanisms could restrain the ball 10 from moving downstream through the bore 7, and yet allow the ball to oscillate transversely in the bore 7. Also, the embodiment of my invention depicted in FIGS. 5 and 6 can be modifed by extending the length of rod 18 through the outlet end 9 of the bore 7 and attaching to the downstream end of the rod 18 a visible fish attractant, which attractant will oscillate when the ball 10 oscillates. The materials of which the ball 10 and lure body 4 are made can also be varied widely, so long as they are sufficiently sturdy and elastic for the intended purpose.

I claim:
1. An audible fish lure comprising:
(a) A lure body, with an inlet end and an outlet end, having a bore through which water flows from inlet end to outlet end, as the said lure is pulled through the water;
(b) Means attached to the lure body for attaching a fishing line thereto;
(c) Means attached to the lure body for attaching a fish hook thereto;
(d) A solid ball of diameter slightly less than the diameter of said bore with respect to said bore diameter and yet of sufficient diameter so to permit water to flow only around said ball and to cause Bernoulli's principle to effect the ball in said bore to thereby cause steady oscillatory action of said ball;
(e) Means approximately midway of the length of said bore for continuously restraining the ball from moving in the direction of flow of the water through the bore, yet still allowing the ball to oscillate back and forth transverse of the flow of water through the bore, and to noisily strike the surface of the bore for providing a hum audible to fish; and, (f) Means for restraining the ball from moving out the inlet end of the bore from a position approximately midway of the bore length.

2. An audible fish lure as recited in claim 1 wherein said means for restraining the ball from moving in the direction of flow of the water through the bore includes a pin disposed on the side of the ball nearest the outlet end of the bore, and the said means for restraining the ball from moving out the inlet end of the bore includes a pin disposed on the side of the ball nearest the inlet end of the bore, wherein further the said pins each extend across the bore in parallel and through the axis of the bore, and wherein each of the said pins is attached at each of its ends to the lure body.

3. An audible fish lure as recited in claim 1 wherein the said means for restraining the ball from moving in the direction of the flow of water through the bore includes a rod disposed along the axis of the bore, the said rod having a first end to which is attached the surface of the ball nearest to the outlet end, and said rod having a second end which terminates approximately at the outlet end of the bore, and wherein the said means for restraining the ball further comprises a pivot pin inserted through the lure body transverse to the bore, through the bore, and through the rod, such that the rod is pivotally positioned on the axis of the bore and free to oscillate about the pivot pin.

4. An audible fish lure as recited in claim 3 wherein the lure body has narrow slots on opposite sides of the bore, parallel to the axis of the bore, and extending between approximately midway the length of the bore and the outlet end of the bore, the pivot pin being disposed within the slots such that the position of the ball and pivot pin is slidably adjustable along the bore, and wherein the diameter of the bore along the bore surface that is within the adjustable contact range of the ball, from the upstream limit of travel of the ball down to the downstream limit of travel of the ball, is reduced from the diameter of the inlet end of the bore down to the diameter of the ball, and wherein the pivot pin further comprises manual means of reversibly attaching the pivot pin to the lure body.

5. An audible fish lure as recited in claim 4 further comprising means for preventing movement of water through the slots.

6. An audible fish lure as recited in claim 1, wherein said means for restraining the ball from moving in the direction of flow of the water through the bore includes a pin disposed on the side of the ball nearest to the outlet end of the bore, wherein the said pin extends across the bore and through the axis of the bore, which pin further comprises manual means of reversibly attaching the pin to the lure body, and wherein the lure body has narrow slots on opposite sides of the bore, parallel to the axis of the bore, and extending between approximately midway the length of the bore and the outlet end of the bore, said slots serving as guide supports for the slidable adjustment of the said pin, and wherein the diameter of the bore along the bore surface that is within the adjustable contact range of the ball, from the upstream limit of travel of the ball down to the downstream limit of travel of the ball, is reduced from the diameter of the inlet end of the bore down to the diameter of the ball; and wherein further the means for restraining the ball from moving out the inlet end of the bore is a pin fixed to the lure body on the side of the ball nearest to the inlet end of the bore and extending across the bore.

7. An audible fish lure as recited in claim 6 further comprising means for preventing movement of water through the slots.

* * * * *